United States Patent
Tsai et al.

(10) Patent No.: US 12,549,030 B2
(45) Date of Patent: Feb. 10, 2026

(54) EMERGENCY LIGHTING DEVICE WITH AUTO-DIMMING DETECTION FUNCTION AND USED IN INVERTER

(71) Applicant: ANTRON ELECTRONICS CO., LTD., Tainan (TW)

(72) Inventors: Wen-Fang Tsai, Tainan (TW); Chia-Chun Tsai, Tainan (TW); Yao-Cheng Tang, Tainan (TW)

(73) Assignee: Antron Electronics Co., Ltd., Tainan (TW)

( * ) Notice: Subject to any disclaimer, the term of this patent is extended or adjusted under 35 U.S.C. 154(b) by 37 days.

(21) Appl. No.: 18/768,117

(22) Filed: Jul. 10, 2024

(65) Prior Publication Data
US 2025/0183703 A1    Jun. 5, 2025

(30) Foreign Application Priority Data
Dec. 1, 2023    (CN) .......................... 202323288892.3

(51) Int. Cl.
| | |
|---|---|
| *H05B 45/00* | (2022.01) |
| *H02J 9/06* | (2006.01) |
| *H05B 45/14* | (2020.01) |
| *H05B 45/325* | (2020.01) |
| *H05B 45/38* | (2020.01) |

(52) U.S. Cl.
CPC .............. *H02J 9/065* (2013.01); *H05B 45/14* (2020.01); *H05B 45/325* (2020.01); *H05B 45/38* (2020.01)

(58) Field of Classification Search
CPC ........ H05B 45/00; H05B 45/10; H05B 45/14; H05B 45/325; H05B 45/37; H05B 45/38; H02J 9/00; H02J 9/065
See application file for complete search history.

(56) References Cited

U.S. PATENT DOCUMENTS

| | | | |
|---|---|---|---|
| 10,432,021 B2 * | 10/2019 | Shen ...................... | H05B 47/14 |
| 2013/0147376 A1 * | 6/2013 | Trainor ................. | H05B 47/172 |
| | | | 315/240 |
| 2018/0368222 A1 * | 12/2018 | Altenburger ........... | H02J 7/0068 |
| 2019/0027958 A1 * | 1/2019 | Kuo ........................ | H05B 47/20 |
| 2023/0050324 A1 * | 2/2023 | Wang ...................... | H02J 9/065 |
| 2024/0049374 A1 * | 2/2024 | Sabnis .................... | H05B 45/14 |

* cited by examiner

*Primary Examiner* — Thai Pham
(74) *Attorney, Agent, or Firm* — Rosenberg, Klein & Lee

(57) ABSTRACT

An emergency lighting device with an auto-dimming detection function and used in an inverter system is provided. After receiving sensing signals from a sensor, a control unit of an emergency lighting device outputs signals for control of a dimmer to carry out dimming of a light source and control output power. No matter how many light emitting diodes are mounted in a light emitting diode module of the light source, a battery is further controlled to maintain a fixed output current by control of light brightness of the light source. Thereby not only luminous flux of the light source can be calculated accurately, use and arrangement of the emergency lighting device are easier. Installation cost is significantly reduced and manufacturers can label service time of the device accurately. The emergency lighting device is safer and more convenient to use.

2 Claims, 1 Drawing Sheet

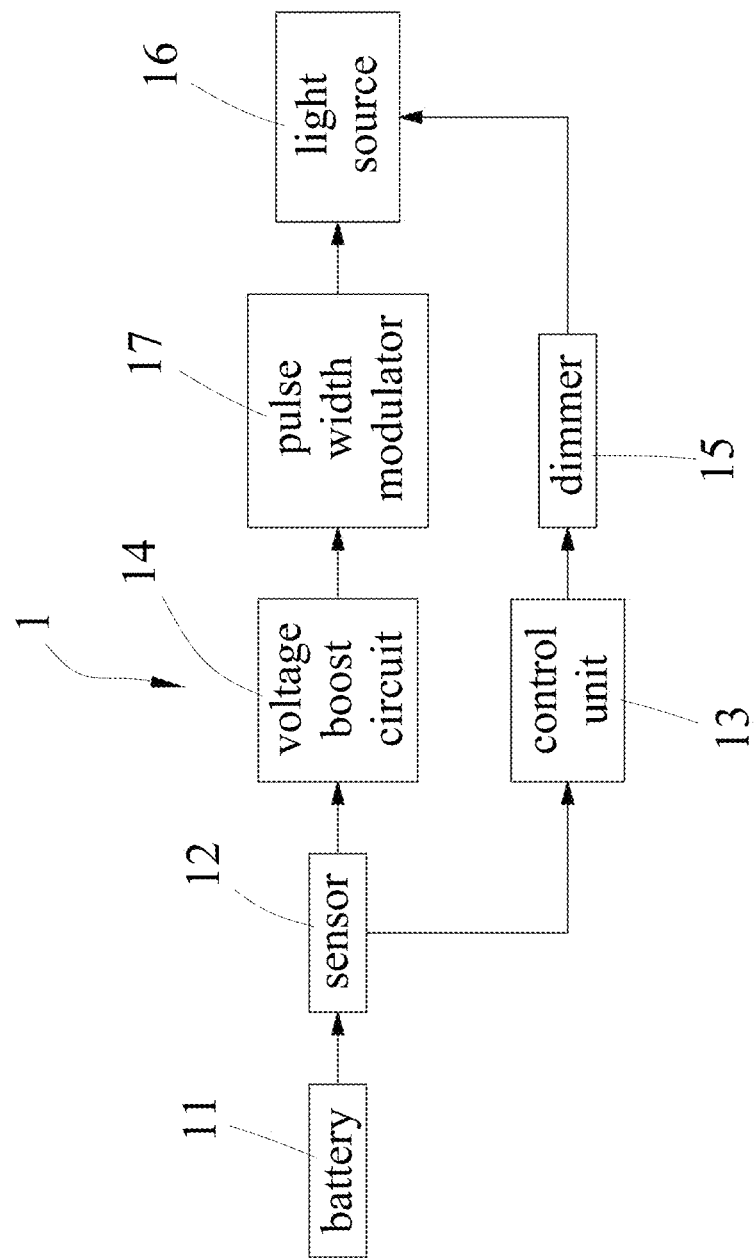

EMERGENCY LIGHTING DEVICE WITH AUTO-DIMMING DETECTION FUNCTION AND USED IN INVERTER

BACKGROUND OF THE INVENTION

Field of the Invention

The present invention relates to an emergency lighting device, especially to an emergency lighting device with an auto-dimming detection function and used in an inverter system, which is not only able to calculate a luminous flux of the light source accurately, but also more convenient to use and dispose. Moreover, installation cost is reduced dramatically and manufacturers can label service time of the device accurately. The safety of the emergency lighting device in use is ensured and the emergency lighting device is more convenient to use.

Description of Related Art

Refer to "Standards for Installation of Fire Safety Equipment Based on Use and Occupancy" in fire service regulations, multi-purpose buildings must be equipped with emergency lighting equipment. Generally, the emergency lighting equipment is arranged at aisles, stairways, and passages in companies, buildings, or apartments. The emergency lighting equipment includes a charging circuit connected with a rechargeable battery which is connected to a light source. A toggle switch is connected with and disposed between the rechargeable battery and the light source and also connected to power outage sensing circuit. Under normal conditions, the charging circuit charges the rechargeable battery to make the rechargeable battery in a sufficient state. As to emergency conditions such as power outage and power cut, the toggle switch is automatically switched to a conductive state once the power outage sensing circuit detects that no power is input. Thus power required by the light source is provided by the rechargeable battery and light is emitted by the light source for illumination.

Moreover, the emergency lighting equipment can also be directly connected to or disposed on lighting fixtures inside the building. Under normal condition, utility power is respectively provided to light sources of the lighting fixtures and the emergency lighting equipment for light emittance and charging. Yet under emergency conditions such as power outage and power cut, the emergency lighting equipment provides a direct current (DC) which is converted into an alternating current (AC) by an inverter system. Then the alternating current is directly provided to the light sources of the lighting fixtures to emit light for illumination.

The above light source functions as expected to emit light during emergency conditions. However, most of the light sources are light emitting diode (LED) module which includes different numbers of LEDs so that power consumed by the respective LED modules is different from one another while in use. Thus manufacturers are unable to label service time and accurate luminous flux on the emergency lighting equipment. Thereby users may misjudge situations and safety in use is further affected.

Thus there is room for improvement and there is a need to provide an emergency lighting device with an auto-dimming detection function and used in an inverter system, which is more convenient to use.

SUMMARY OF THE INVENTION

Therefore, it is a primary object of the present invention to provide an emergency lighting device having an auto-dimming detection function and used in an inverter system. No matter how many light emitting diodes are included in a light emitting diode module of the light source of the emergency lighting device, a battery is controlled to maintain a fixed output current by control of light brightness of the light source. Thereby not only a luminous flux of the light source can be calculated accurately, use and arrangement of the emergency lighting device are easier. Moreover, installation cost is reduced dramatically and manufacturers can label service time of the device accurately. The safety of the emergency lighting device in use is ensured and the emergency lighting device is more convenient to use.

In order to achieve the above object, an emergency lighting device having an auto-dimming detection function and used in an inverter system according to the present invention mainly includes a battery electrically connected to a sensor which senses current output from the battery. The sensor is electrically connected to a voltage boost circuit and a control unit which is electrically connected to a dimmer. The dimmer is electrically connected to a light source which is a light emitting diode (LED) module provided with a plurality of light emitting diodes (LEDs). After receiving sensing signals from the sensor, the control unit outputs signals for control of the dimmer to carry out dimming of the light source and further control output power. The voltage boost circuit is electrically connected to a pulse width modulator which is electrically connected to the light source. After a voltage of the battery being boosted by the voltage boost circuit, a direct current (DC) is converted into an alternating current (AC) by the pulse width modulator and then transmitted to the light source to make the light source emit light for illumination.

Preferably, the voltage boost circuit is a push-pull voltage boost circuit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

The FIGURE is a block diagram showing structure of an embodiment according to the present invention.

DETAILED DESCRIPTION OF THE PREFERRED EMBODIMENT

In order to learn technical content, features, and functions of the present invention more clearly and completely, please refer to the following embodiments with related FIGURES and reference signs.

Refer to the FIGURE, an emergency lighting device 1 according to the present invention mainly includes a battery 11, a sensor 12 electrically connected with the battery 11 for sensing the amount of current output from the battery 1, a control unit 13, a voltage boost circuit 14, a dimmer 15, a light source 16, and a pulse width modulator 17. The sensor 12 is further electrically connected to the control unit 13 and the voltage boost circuit 14. The control unit 13 is electrically connected to the dimmer 15 which is electrically connected to the light source 16. The light source 16 is a light emitting diode (LED) module provided with a plurality of LEDs. After receiving sensing signals from the sensor 12, the control unit 13 outputs signals for control of the dimmer 15 to carry out dimming of the light source 16 and control output power. The voltage boost circuit 14 which is able to be a push-pull voltage boost circuit is electrically connected to the pulse width modulator 17 which is electrically connected to the light source 16. Thereby after a voltage of the battery 11 being boosted by the voltage boost circuit 14, the pulse width modulator 17 converts a direct current (DC) into an alternating current (AC) which is then transmitted to the light source 16 to make the light source 16 emit light for illumination purposes.

While in use, the control unit 13 of the emergency lighting device 1 sets the maximum current consumed by the battery 11 at an initial state. When emergent conditions (such as power outage, power cut, etc.) occur, the emergency lighting device 1 is activated so that sensor 12 detects the current output from the battery 11 and transmits sensing signals to the control unit 13. Then the control unit 13 outputs signals to the dimmer 15 according to the current output from the battery 11 and detected by the sensor 12. Thereby the dimmer 15 performs dimming of the light source 16 and makes control of the output power. And the current output from the battery 11 is maintained at the maximum current consumed set in the initial state under control of the dimmer 15. At the same time, a voltage input is boosted by the voltage boost circuit 14 and the direct current (DC) is converted into the alternating current (AC) by the pulse width modulator 17 and then transmitted to the light source 16 to make the light source 16 emit light for illumination purposes. Now since the dimmer 15 controls the output power and maintains the output power at a fixed value, current output duration provided by the battery 11 reaches a preset time. Thereby a power supply period during the power outage or blackout is maintained at a fixed value. That means a luminous flux of the light source 16 can be calculated accurately and this helps accurate labelling by manufacturers.

Compared with techniques available now, the present invention controls the battery to maintain a fixed output current by control of light brightness of the light source no matter how many LEDs are included in the LED module of the light source. Thereby not only a luminous flux of the light source can be calculated accurately, use and arrangement of the emergency lighting device are more convenient. Moreover, installation cost is reduced dramatically and manufacturers can label service time of the device for illumination accurately. The safety of the emergency lighting device in use is ensured and the emergency lighting device is more convenient to use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An emergency lighting device with an auto-dimming detection function and used in an inverter system comprising:
   a battery,
   a sensor electrically connected to the battery for sensing current output from the battery,
   a control unit electrically connected to the sensor,
   a voltage boost circuit electrically connected to the sensor,
   a dimmer electrically connected to the control unit,
   a light source electrically connected to the dimmer, and
   a pulse width modulator;
wherein the light source is a light emitting diode (LED) module provided with a plurality of light emitting diodes (LEDs); after receiving sensing signals from the sensor, the control unit outputs signals for control of the dimmer to carry out dimming of the light source and further control output power; the voltage boost circuit is electrically connected to the pulse width modulator which is electrically connected to the light source; after a voltage of the battery being boosted by the voltage boost circuit, a direct current (DC) is converted into an alternating current (AC) by the pulse width modulator and then transmitted to the light source to make the light source emit light for illumination.

2. The device as claimed in claim 1, wherein the voltage boost circuit is a push-pull voltage boost circuit.

* * * * *